United States Patent [19]
Ensor et al.

[11] 3,796,911
[45] Mar. 12, 1974

[54] WAVEFORM CORRECTION FOR RESONANT RECOVERY DEFLECTION SYSTEMS

[75] Inventors: John W. Ensor, New Windsor; Alfred E. Popodi, Glen Burnie, both of Md.

[73] Assignee: Westinghouse Electric Corporation, Pittsburgh, Pa.

[22] Filed: Sept. 25, 1972

[21] Appl. No.: 292,208

[52] U.S. Cl. .................... 315/27 GD
[51] Int. Cl. .................... H01j 29/70
[58] Field of Search .................... 315/27 R, 27 GD

[56] References Cited

UNITED STATES PATENTS

| | | | |
|---|---|---|---|
| 2,869,026 | 1/1959 | Sanford | 315/27 GD |
| 3,426,243 | 2/1969 | Smeulers et al. | 315/27 GD |
| 3,428,853 | 2/1969 | Akatsu | 315/27 GD |
| 3,428,856 | 2/1969 | Jones | 315/27 GD |
| 3,660,717 | 5/1972 | Eltgroth | 315/27 GD |
| 3,221,259 | 11/1965 | Bates | 315/27 R X |
| 3,678,332 | 7/1972 | Boekhorst | 315/27 R |

*Primary Examiner*—Benjamin R. Padgett
*Assistant Examiner*—P. A. Nelson
*Attorney, Agent, or Firm*—D. Schron

[57] ABSTRACT

The electrical current waveform of a resonant recovery deflection amplifier is corrected to meet requirements of linearity in cathode ray tube displays. A correction amplifier receives as one input a voltage proportional to the derivative of the current in the deflection yoke, as derived from a current transformer connected in series with the deflection yoke, and as a second input a voltage comprising the derivative of a linearity corrected reference sweep voltage. The correction amplifier output is supplied to the deflection yoke circuit, the latter including an S-curve correction capacitor, thereby making the electrical current waveform more symmetrical. The system of the invention maintains the efficiency of a resonant recovery amplifier while providing a current waveform satisfying linearity requirements of precision displays.

14 Claims, 12 Drawing Figures

WAVEFORM CORRECTION FOR RESONANT RECOVERY DEFLECTION SYSTEMS

BACKGROUND OF THE INVENTION

1. Field of the Invention

The invention relates to the field of cathode ray tube deflection circuits and, in particular, to a resonant recovery deflection system of improved waveform characteristics.

2. State of the Prior Art

A magnetic deflection amplifier for a cathode ray tube (CRT) must fulfill two basic requirements. First, it must supply the necessary current amplitude dependent on CRT parameters and anode voltage. Second, it must provide the proper current waveform to meet the linearity requirements of the CRT display for the particular application.

Two types of deflection circuits have been used heretofore, characterized as a class A amplifier circuit in one case and a resonant recovery circuit in the other case. In the class A amplifier, the deflection yoke is a part of a feedback loop in which a current sensing resistor connected in series with the yoke is used to sample the yoke current. The voltage across the resistor is compared with the amplifier input signal which has been shaped to meet the linearity requirements. The difference between the two signals is amplified and applied to the yoke. Whereas the class A amplifier affords good waveform reproduction and the circuit may be adjusted to provide a specific desired current waveform, it presents the disadvantage of low efficiency in its use of electrical power from a power supply for generating the CRT deflection current waveforms. Thus, where high currents and wide bandwidths are required, this approach is impractical. For example, with a raster type display having short horizontal sweeps, a class A system is wasteful of power and also more susceptible to catastrophic failures.

A resonant recovery system, on the other hand, can provide large deflection currents much more economically, in terms of efficiency in use of electrical supply power; however, this approach suffers from poor waveform linearity, and the generation of a specific current waveform is very difficult. Thus, in the past, resonant recovery systems have not been useful in precision displays.

A typical prior art resonant recovery circuit is shown in FIG. 1. The circuit consists of the deflection yoke L, the S-curve correction capacitor C2, the retrace capacitor C1, switching transistor Q, and damper diode CR. Coil L1 is a charging choke of high inductance. Resistor R represents the combined circuit losses. It can be shown that the inherent current waveform of this circuit deviates considerably from the ideal waveform, particularly if high deflection currents are required or if the deflection angle is large. Because of losses in the circuit, notably resistive losses, the slope, or time rate of change, of the current waveform produced thereby is always too large at the beginning and too small at the end of the sweep period. The resulting unsymmetrical current waveform is shown in FIG. 2, and may be compared with the ideal waveform also illustrated therein.

One possible method of waveform correction employs a correction amplifier, shown in FIG. 3 at A, which receives as an input a voltage derived from a current transformer connected in series with the deflection yoke L, and supplies as an output a voltage to the S-curve correction capacitor C2, the latter then providing a correction current to the deflection yoke L. The input voltage to the correction amplifier A is proportional to the instantaneous value of the deflection current. The effect of the correction is that the current waveform becomes more symmetrical and more nearly approximates the center portion of a sine wave. For small deflection angles of a particular CRT application, and where linearity of sweep requirements are not too stringent, the above approach to waveform correction is adequate. However, for precision CRT displays, and for applications where a large correction to the current waveform is required, additional linearity control is needed and as such is beyond the capability of prior art correction systems, such as that of FIG. 3.

SUMMARY OF THE INVENTION

The resonant recovery deflection system of the invention includes as the basic deflection circuit, the aforedescribed prior art arrangement of a switching transistor and damper diode, and a charging choke coil and retrace capacitor; typically, the deflection yoke and an S-curve correction capacitor are connected in series to the junction of the choke coil and the retrace capacitor.

In the invention, the output of a correction amplifier is applied to the deflection yoke circuit and, for the noted typical circuit arrangement, may be applied to the S-curve correction capacitor connected in series with the deflection yoke coil. The effect of this correction is that the current waveform becomes more symmetrical and more nearly identical to the S-shaped waveform that is required for perfect linearity correction. One input to the correction amplifier is derived from a current transformer which is connected in series with the deflection yoke; the voltage output of the current transformer is proportional to the instantaneous value of the deflection current. That output, differentiated and diode clipped, is made input to the correction amplifier through a first summing resistor. A second input to the correction amplifier is derived from the linearity corrected sweep voltage; particularly, the sweep voltage, differentiated and diode clipped, is made input to the correction amplifier through a second summing resistor.

In operation, correction efficiency is high due to the differential current and voltage waveform inputs to the correction amplifier. Due to the differentiating process, slope differences between the desired and actual current waveform are emphasized and therefore, fewer stages of amplification are required resulting in wider bandwidth, higher accuracy and lower cost. A wide bandwidth is desirable for achieving the required waveform characteristics of linearity, while affording large values of deflection currents. In addition, the stability of the correction amplifier in the control loop of the invention is readily maintained due to the use of differentiated input waveforms. Diode clippers following each differentiator keep voltage spikes, generated during the retrace period, from overloading the correction amplifier, thereby assuring a minimum settling time and preserving linearity.

The waveform correction system of the invention accordingly permits use of the inherently economical resonant recovery deflection amplifier in applications imposing stringent linearity requirements, such as precision displays which, in the past, required the use of low efficiency systems, such as the above-described class A amplifier systems.

DETAILED DESCRIPTION OF THE INVENTION

Before considering the invention in detail, it is appropriate initially to consider the function of magnetic beam deflection in a CRT and the requirements of proper deflection waveforms thereby imposed.

Magnetic deflection of the CRT beam is in practice, inevitably associated with geometric distortion (pincushion distortion) especially if the CRT has a flat face. For example, the pincushion error at the edge of a flat faced CRT with a ± 35° deflection angle is ± 18 percent at full deflection. To obtain a linear relationship between the deflection amplifier input and the actual spot deflection, the transfer curve of the deflection amplifier must be S-shaped. Linearity correction circuits provide this nonlinear relationship, as is known.

Perfect linearity correction at all CRT screen locations requires a cross connection between the horizontal and vertical deflection amplifiers such that a small portion of the corrected vertical deflection signal is added to the horizontal input and vice versa. This approach, however, is not economical and is complex. A more practical solution is to provide accurate on-axis correction in the horizontal and vertical directions with electrical means and to correct for off-axis distortion with external magnets.

In TV-type displays the vertical deflection is relatively slow and requires lower current. Thus, the class A amplifier is acceptable for this function. The horizontal deflection, however, requires high rates at high currents; a resonant recovery system affords these characteristics and, in accordance with the waveform correction technique of the invention, may be employed for this purpose, even with precision display systems imposing high resolution and linearity requirements. Accordingly, in the following analysis, it is assumed that the purpose of the waveform correction is to provide this on-axis, S-shaped current waveform for horizontal magnetic deflection in a CRT. It will be apparent, of course, that the system of the invention may as well be employed for the vertical deflection.

Figure 1:
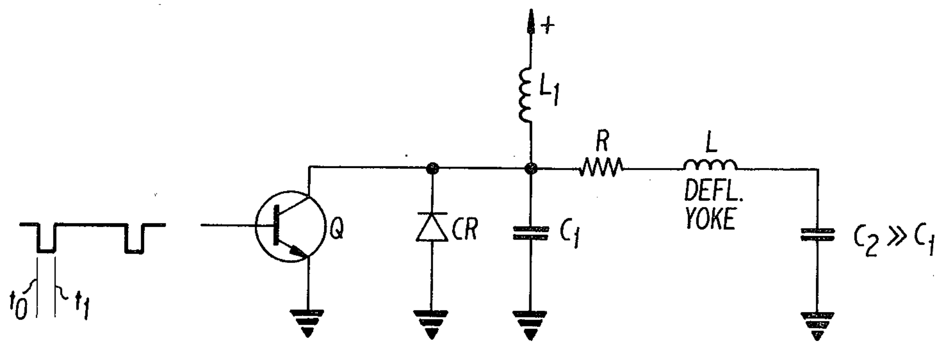
FIG. 1 PRIOR ART
FIG. 1 is a schematic of a typical prior art resonant recovery deflection circuit.
Figure 2:
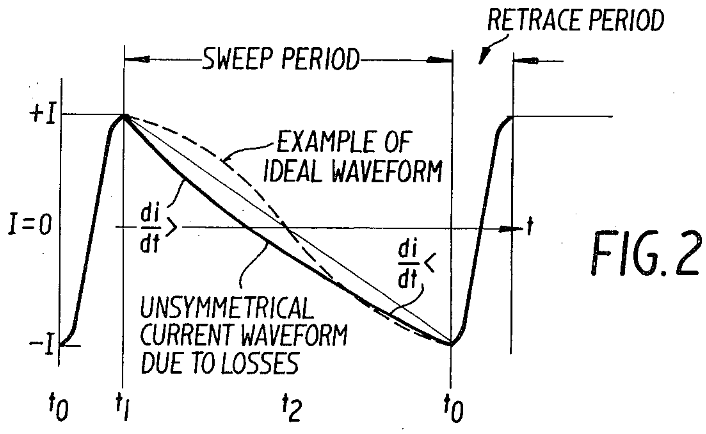
FIG. 2 is a plot of deflection current waveforms, as generated by an uncorrected deflection system, and the waveform of an ideal system, and which is substantially attained by the waveform correction system of the invention.
Figure 3:
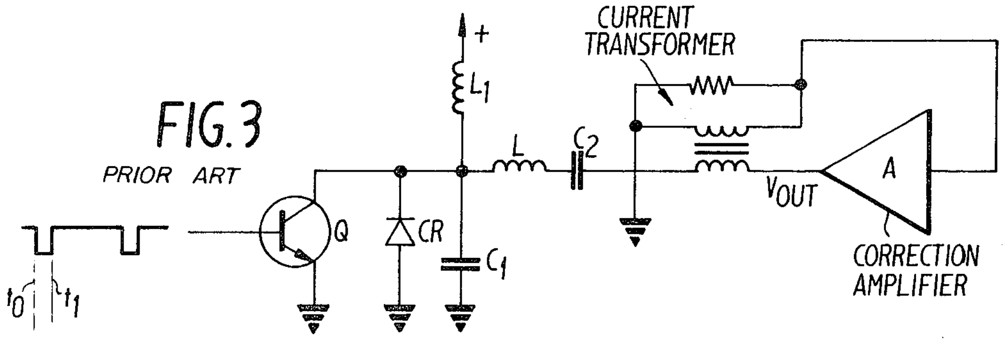
FIG. 3 PRIOR ART
FIG. 3 is a schematic of a deflection circuit as in FIG. 1, incorporating a prior art waveform correction circuit.

Considering first the operation of the basic resonant recovery circuit of FIG. 1, during the second half of the sweep period, i.e., from $t_2$ to $t_o$ in FIG. 2, transistor Q conducts and capacitor $C_2$ serves as the energy source. At time $t_o$, the end of the sweep, the deflection current reaches its negative peak; transistor Q is cut off and the retrace period begins. The stored energy in the yoke inductance L causes a sinusoidal voltage build-up of several hundred volts across the small retrace capacitor $C_1$. When this voltage reaches zero, at time $t_1$, diode CR begins to conduct and the actual sweep begins. The energy source is again the deflection yoke. At time $t_2$, the current polarity reverses, diode CR stops conducting, and transistor Q begins to conduct until the end of the sweep. Capacitor $C_2$ again serves as the energy source, from time $t_2$ to time $t_o$.

Figure 4:
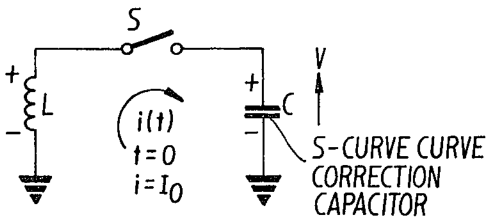
FIG. 4 is a schematic of the equivalent circuit of the basic resonant recovery deflection system of FIG. 1, assuming loss-less operation.
Figure 5:
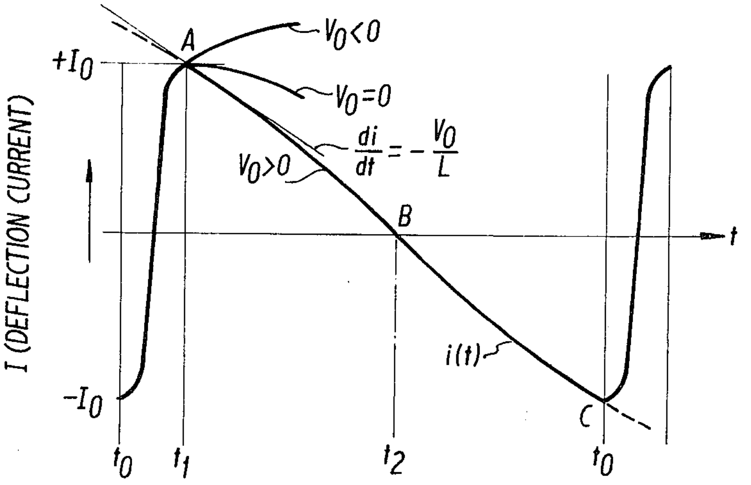
FIG. 5 is a waveform plot corresponding to current waveforms generated by the circuit of FIG. 4, indicating the effects of different operating parameters.

The basic resonant recovery circuit of FIG. 1 and the current waveform produced thereby can be understood more readily by reference to FIG. 4 which shows the equivalent circuit of a loss-less such basic circuit, and to the waveform plot of FIG. 5 related thereto. In FIG. 4, inductor L is the deflection yoke inductance and capacitor C is the S-curve correction capacitor $C_2$ of FIG. 1. Switch S represents the switching function of transistor Q.

In the plot of FIG. 5, and for a loss-less circuit as shown for the equivalent circuit of FIG. 4, the deflection current has its maximum at time $t_1$, when the sweep begins, with the indicated polarity, the inductance L of the deflection yoke being the energy source. Capacitor C has a positive charge that opposes the current flow. The lower terminal of inductor L in FIG. 4 can be assumed to be at ground potential during the sweep period since, with reference to FIG. 1, either the diode CR or the transistor Q conducts during the sweep time.

When the switch S is closed, the voltage across the capacitor C is $V = V_o$ and the current $i(t) = I_o$. Since L is the energy source, and letting C = the capacitance of capacitor C:

$$V = -L(di/dt),\ i = C(dV/dt) \tag{1}$$

From this, $$i + LC(d^2i/dt^2) = 0,\ \omega^2 LC = 1 \tag{2}$$

Applying the Laplace Transform:

$$I(s) + LC\{s^2 I(s) - si(o) - (di/dt)_{t=o}\} = 0 \quad (3)$$

This yields $$I(s) = [sI_0/\omega 2_{(1+s^2)/\omega 2}] - [V_0 C/1 + s^2/\omega 2] \quad (4)$$

The solution in the time domain is $$i(t) = I_o \cos \omega t - V_o/Z \sin \omega t, \quad (5)$$

where $Z = \sqrt{L/C}$

Equation 5 is the mathematical expression for the waveform illustrated in Fig. 5.

The waveform plot of FIG. 5 shows that the current I varies sinusoidally from $+I_o$ at A to $-I_o$ at C, with the initial slope $di/dt = -V_o/L$; this slope is independent of the size of capacitor C. Zero crossing point B lies exactly midpoint between A and C. If $V_o$ is more positive, shown as $V_o > 0$, the current decay is faster. If $V_o = 0$, the initial tangent $di/dt$ is horizontal. If $V_o$ is negative, shown as $V_o < 0$, the current rises. It is interesting to note that the waveform between A and C is the center portion of a large sine wave that becomes more linear, the larger the value of capacitor C becomes. On the other hand, a smaller value of capacitor C renders the waveform more S-shaped. For this reason capacitor C is called an S-curve correction capacitor.

As mentioned before, a time varying correction signal may be added to the deflection signal otherwise generated by the circuit to modify the deflection waveform. The actual waveform of the time varying, correction signal to be provided to achieve a desired current waveform depends upon the particular circuit application. Generally, a correction signal increasing in the positive direction causes a faster increase of $di/dt$ of the deflection current. A constant DC level has no effect on the current waveform.

Figure 6:
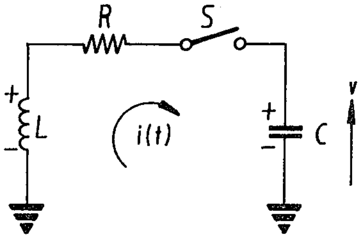
FIG. 6 is an equivalent circuit schematic, corresponding to that of FIG. 4, but including losses.

The circuit of FIG. 1 of course includes losses, and these may be represented by a resistor R in the equivalent circuit of FIG. 1, as shown in FIG. 6. When the switch S is closed, the voltage across capacitor C is:

$$V = -L(di/dt) - iR \quad (6)$$

In the circuit, $i(t) = C(dV/dt)$ and at time $t = 0$, $i = I_o$ and $V = V_o$. From this:

$$i(t) = -LC(d^2i/dt^2) - RC(di/dt) \quad (7)$$

Applying the Laplace Transform, yields:

$$I(s) + LC\{s^2 I(s) - si(o) - (di/dt)_{t=o}\} + RC\{sI(s) - i(o)\} = 0 \quad (8)$$

The solution in the time domain is:

$$i(t) = \frac{e^{-\frac{t}{2T_L}}}{\sqrt{1-\frac{T}{4T_L}}}\left\{I_0 \sin\left(\omega\sqrt{1-\frac{T}{4T_L}}\,t+\psi\right) - \frac{V_0}{Z}\sin\omega\sqrt{1-\frac{T}{4T_L}}\,t\right\} \quad (9)$$

with $$T = RC,\ T_L = L/R,\ \omega^2 LC = 1,\ Z = \sqrt{L/C},\ \sin\Psi = \sqrt{1-\xi^2},\ \xi = R/2Z\ \xi > 90° \quad (10)$$

Figure 7:
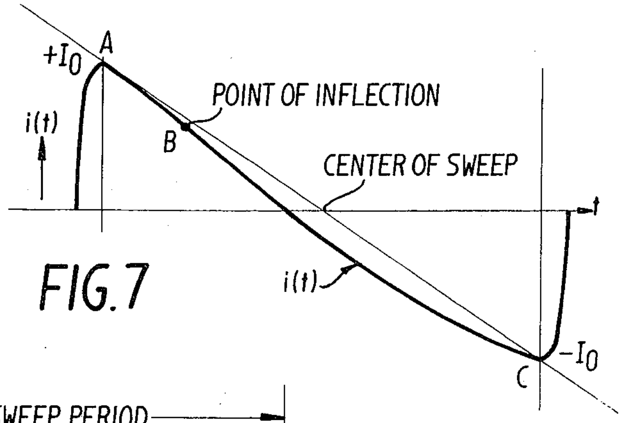
FIG. 7 is a waveform plot corresponding to a waveform generated by the equivalent circuit of FIG. 6.

The term in the parenthesis represents a symmetrical, sinusoidal, current waveform as in the loss-less case. The remaining term is an exponentially decaying function, and produces the result of an unsymmetrical waveform whose point of inflection B is now to the left of the center, as seen in the waveform plot of FIG. 7. The first portion of the sweep appears more nearly like a straight line with the slope gradually decaying towards the end of the sweep. In terms of display linearity, this means that the CRT spot velocity in the first half of the sweep is too high compared to that in the second half, resulting in expansion of the video presentation in the first half and compression in the second half. This is the inherent current waveform of the resonant recovery system. It deviates considerably from the ideal, symmetrical, S-shaped curve, as is apparent from FIG. 2.

For a flat faced, magnetically deflected CRT, the linearity correction factor $k$ is defined by:

$$k = (i_{corr}/i_{unc}) = 1/\sqrt{1+p^2\tan^2\alpha} \quad (11)$$

where $k$ is the ratio of corrected to uncorrected deflection current;

"$\alpha$" is the maximum deflection angle at the tube edge; and

"$p$" is the relative input amplitude varying between "0" and "1".

The mathematical expression for a time varying deflection current that is linearity corrected and that varies between $-I_o$ and $+I_o$ during the sweep interval is therefore $$i(t) = I_0 \frac{-\frac{2t-T}{T}}{\sqrt{1+\left(\frac{2t-T}{T}\right)^2\tan^2\alpha}} \quad (12)$$

where $\alpha$ is the maximum deflection angle $t$ is time;

T is sweep time; and $I_o$ is the uncorrected deflection current at time $t = 0$.

Figure 8:
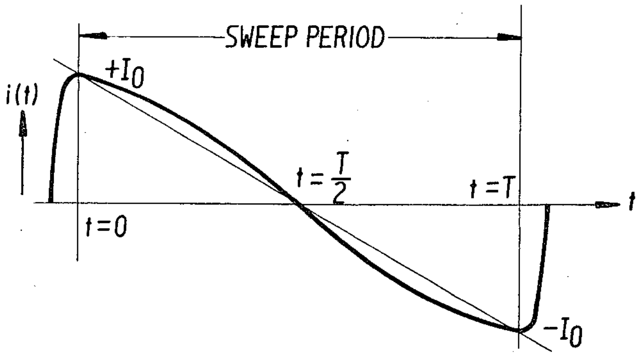
FIG. 8 is a waveform plot representing the ideal, on-axis waveform of a deflection current corrected for pincushion distortion.

This relationship is shown in FIG. 8, the waveform plot thereof representing the ideal, on-axis waveform of the deflection current corrected for pincushion distortion. The sweep generator must ultimately deliver this waveform to the deflection yoke if a linear spot deflection versus time is required.

By comparing the ideal and actual current waveforms, it is possible to derive the general shape for the correction voltage for a resonant recovery system where linearity correction must be applied to achieve constant on-axis spot velocity. As shown in FIG. 8, the slope $di/dt$ must increase gradually during the first half of the sweep. Since the actual current slope increases only slightly between points A and B (see FIG. 7), a correction voltage must be applied that increases in the positive direction with time. During the second half of the sweep, the slope $di/dt$ must decrease gradually. Since the deflection circuit already provides this slope decrease to some degree, the correction voltage cannot rise as fast and may even have to decay.

Figure 9:
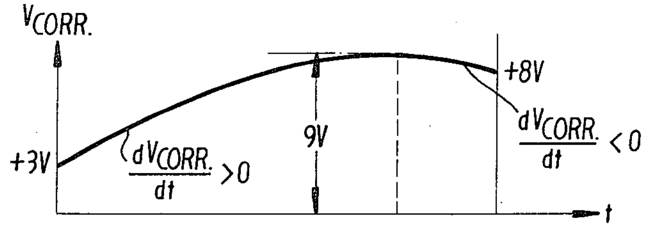
FIG. 9 is a waveform plot of a typical correction voltage waveform.

In FIG. 9 is shown a typical correction voltage waveform utilized to achieve a linearity corrected sweep corresponding to the ideal waveform of FIG. 8. The latter may represent a current variation of 12 A peak to peak for the correction voltage swing of 7V, such as might be used for a 22-inch flat faced CRT with a maximum linearity error of 18 percent at the edge.

Figure 10:
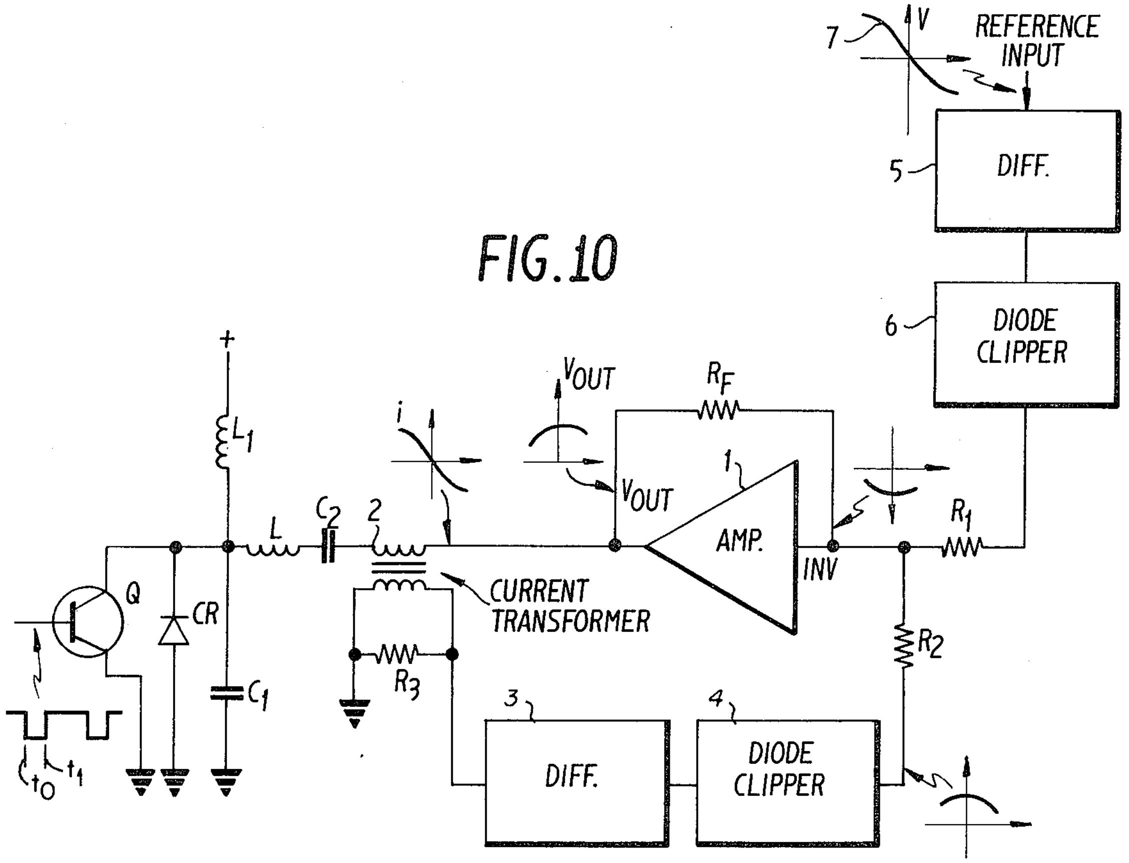
FIG. 10 is a schematic, in generalized block diagram form, of a resonant recovery deflection system incorporating the waveform correction circuit of the invention.

The circuit in accordance with the invention is shown in FIG. 10 in a generalized block diagram form. The basic deflection amplifier circuit comprises a transistor Q, damper diode CR, retrace capacitor C1, deflection yoke L, S-curve correction capacitor C2 and charging choke L1. The deflection circuit receives timing pulses at the base of transistor Q and produces a current waveform as there shown.

Current transformer 2, connected in series with the deflection yoke L and S-curve correction capacitor C2, develops a voltage across resistor R3 which is proportional to the current in the deflection circuit. The voltage waveform across resistor R3 is made input to differentiator 3, the output of which is clipped in diode clipper 4 and supplied through summing resistor R2 to amplifier 1. Amplifier 1 is stabilized by feedback resistor RF. In a similar manner, the second input to amplifier 1 is developed from the linearity corrected sweep voltage 7, through differentiator 5. Particularly, the output of differentiator 5 is clipped in diode clipper 6 and supplied through summing resistor R1 to the input of amplifier 1.

As illustrated in FIG. 10, the output of diode clipper 4 is a waveform with downward curvature and the output of diode clipper 6 is a waveform with upward curvature. The sum of these waveforms, produced at the junction of resistors R2 and R1, is a difference voltage which is supplied to the input to amplifier 1. Amplifier 1 amplifies and inverts the input voltage resulting in an output voltage $V_{out}$ having a waveform with downward curvature. The voltage applied to the deflection yoke is then the sum of the voltage across the S-curve correction capacitor C2 and output voltage $V_{out}$. This then produces the corrected current waveform through the deflection yoke L.

The system of the invention, as shown in FIG. 10, thus affords a loop-type operation, the correction amplifier 1 responding to the differentiated signal from current transformer 2 and to the differentiated signal derived from the linearity corrected sweep voltage 7 in producing the output waveform correction voltage supplied to the deflection yoke circuit. As shown, the amplifier output is applied to capacitor C2; as is well known, correction capacitor C2 can be connected elsewhere in the circuit, provided the series relationship with the deflection yoke is maintained.

. The deflection waveform produced in accordance with the correction system of the invention will be seen, in practice, to approach closely the ideal deflection waveform. Particularly, in FIG. 2, the solid curve shows an unsymmetrical current waveform as produced by a deflection system which does not afford waveform correction. The lack of symmetry results from losses in the circuit, and results in the slope of the current waveform, $di/dt$ being too high at the beginning of the sweep period, as indicated by the symbol $di/dt >$, and too low, as indicated by the symbol $di/dt <$, at the end of the sweep period. Conversely, the ideal current waveform, shown in the dashed line curve, is symmetrical and conforms with FIG. 8. For completeness, the retrace period is shown following the sweep period.

To summarize, in accordance with the invention, a sample of the differentiated deflection current is compared with the differentiated reference input and the difference between the two is amplified, inverted, and applied to the sweep circuit. The technique of the invention provides time lag-free correction with improved correction efficiency as compared to prior art techniques, and is satisfactory for large-screen displays with stringent linearity requirements. The differentiators 3 and 5 can be simple RC networks, followed by a single stage amplifier. In FIG. 10, it is assumed that the output of current transformer 2, as developed across resistor R3, is a voltage proportional to the deflection current. This voltage then is differentiated in differentiator 5. As an alternative thereto, both the current transformer and differentiator 3 can be replaced by a differentiating voltage transformer. The reference input, as noted, represents the waveform that the deflection current must have to cancel the pincushion error, as known in the art.

Figure 11:
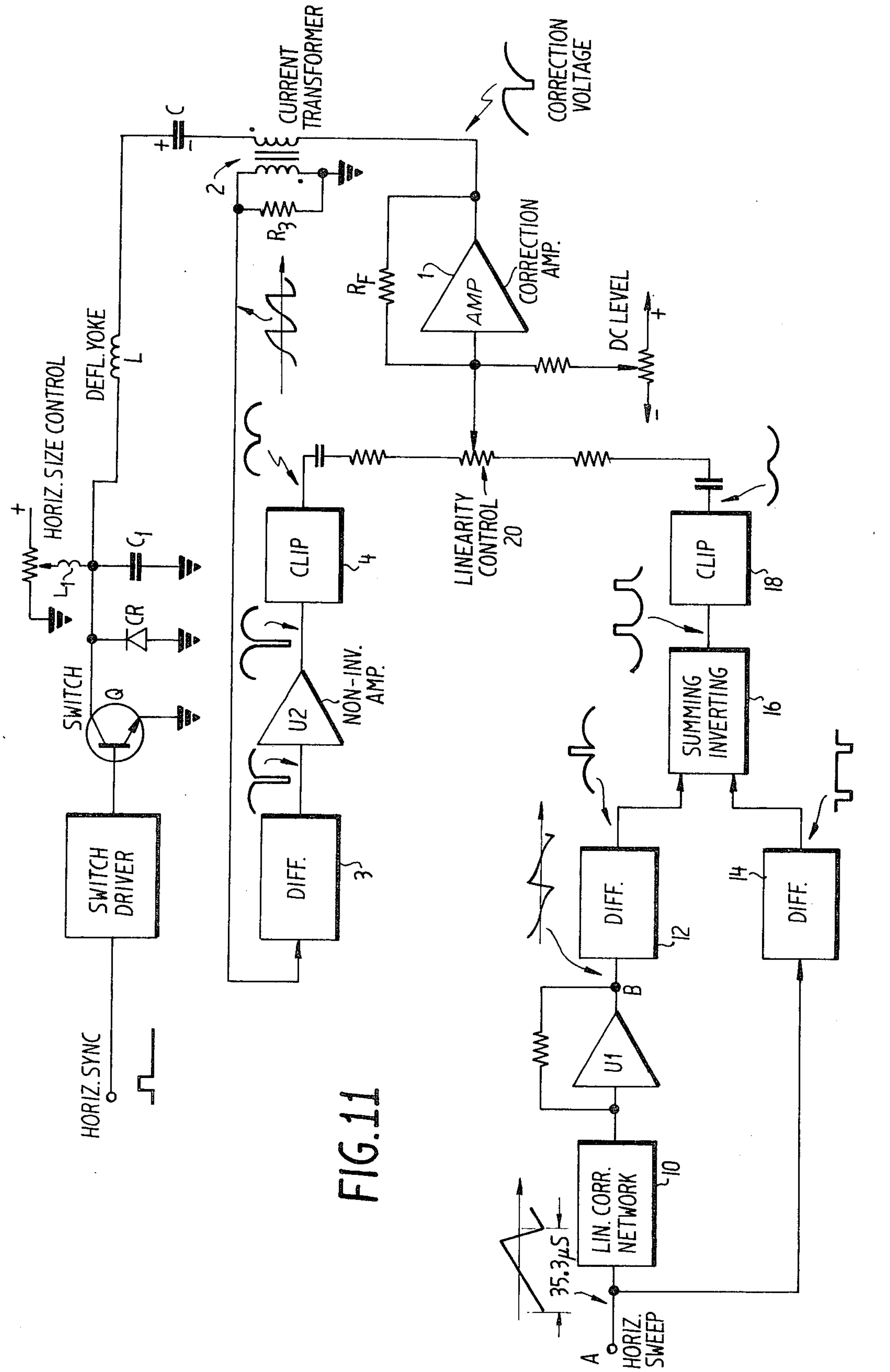
FIG. 11 is a more detailed block diagram corresponding to that of FIG. 10.

A complete and more detailed block diagram of the horizontal deflection circuit of a flat faced, large screen, 22-inch display is shown in FIG. 11. In FIG. 11, identical elements are identified as hereinbefore.

In developing the linearity corrected reference voltage input, a linear ramp signal with a 29 microsecond sweep time and a 6.3 microsecond retrace time is made input at terminal A. The horizontal linearity correction network 10 is a function generator consisting of biased diodes and resistive voltage dividers. Its output current is converted into a voltage by virtue of operational amplifier U1. If the signals at points A and B, the latter being the output of amplifier U1, were added, the familiar S-shaped curve would be obtained. Instead of adding and then differentiating, however, the signals at point A and as produced at the output B of amplifier U1 are differentiated separately by differentiators 12 and 14, and then added by the summing and inverting circuit 16. Thus, the voltage spikes in the outputs of the differentiators 12 and 14 produced at the retrace intervals tend to cancel each other, preventing overloading of the following summing amplifier 16. The next stage is a simple clipper circuit 18 which may comprise a biased diode, which functions to reduce any remaining retrace spike to a defined level.

In the other branch of the system, which relates to the standard resonant recovery deflection circuit, the deflection current is sensed by the current transformer 2, and a voltage proportional thereto is developed across resistor R3, the latter being differentiated in differentiator 3, amplified by non-inverting amplifier U2 and clipped by clipper 4.

The outputs of clippers 4 and 8 are then AC-coupled to the input of the correction amplfier 1. At this point, any remaining retrace spikes, which now have been reduced to low amplitudes, are opposite in polarity, thereby preventing the correction amplifier from overloading. A linearity control 20 may be provided to optimize linearity. Negative feedback through resistor RF, as in FIG. 10, is used to stabilize the operating point of the correction amplifier 1 which preferably is adjustable to ensure class A operation. The DC level, of course, has no effect on the sweep. The correction amplifier 1 is low in gain, and its output stage must be capable of absorbing the full deflection current.

Figure 12:
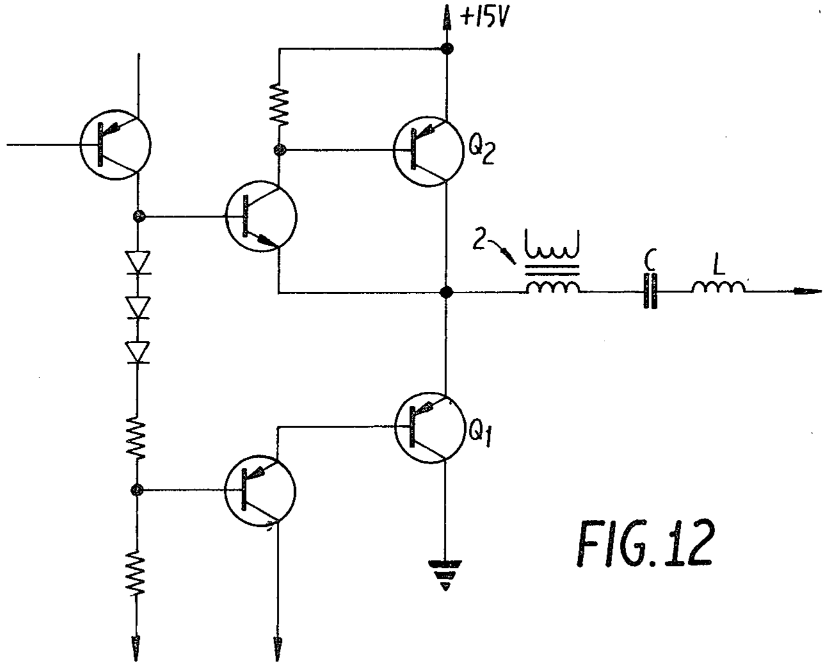
FIG. 12 is a circuit schematic of an illustrative embodiment of a correction amplifier utilized in the waveform correction circuit of the invention.

A typical example of the output stage is shown in FIG. 12. During the first half of the sweep, when the yoke provides the energy, transistor Q1 conducts and, during the second half, transistor Q2 conducts.

In a specific example, for a 22-inch, flat faced CRT with ± 35° deflection angle, the horizontal deflection yoke inductance was 57 microhenries, the deflection current was ±6 Amperes, the sweep time was 29 microseconds, and the retrace time 6.3 microseconds. The nonlinearity due to the CRT geometry (pincushion error) was 18 percent at the edge of the tube. The total sweep nonlinearity due to pincushion error and sweep waveform distortion was measured to be 54 percent. In other words, the *di/dt* value was 1.54 times larger in the first half of the sweep than in the second. Actually, the highest *di/dt* value (i.e., at the point of inflection, and thus the point of highest spot velocity) occurred at about 15 percent of the sweep duration.

When the waveform correction circuit of the invention was utilized in that specific system, the maximum on-axis deviation from linearity was measured to be less than 0.2 percent of the CRT diameter. The linearity was measured by comparing a digitally generated video grating pattern with an accurate overlay. The output swing of the correction amplifier was only 6V peak to peak.

Numerous modifications and adapatations of the system of the invention will be apparent to those skilled in the art and thus it is intended by the appended claims to cover all such modifications and adaptations which fall within the true spirit and scope of the invention.

What is claimed is:

1. In a resonant recovery deflection system having switching means responsive to an input timing signal for periodically energizing the inductor of a magnetic deflection yoke from a power source and including an S-curve correction capacitor in series connection with the deflection inductor, a correction circuit responsive to the inductor current for providing a correction signal to said inductor, comprising:

- a correction amplifier having input and output terminals, and connected at said output terminal for applying the correction signal to said inductor of the deflection yoke,
- first means coupled to said inductor for producing an output voltage proportional to the derivative of the deflection current passing through said inductor,
- second means for producing an output voltage proportional to the derivative of a linearity corrected sweep voltage, and
- summing means for receiving and summing the differentiated voltage outputs of said first and second means for supply to said input terminal of said correction amplifier.

2. A correction circuit as recited in claim 1 wherein there are further provided first and second clippers for receiving and clipping the voltage outputs of said first and second means for supply to said summing means.

3. A correction circuit as recited in claim 1 wherein there is further provided a resistor connecting the input and output terminals of said correction amplifier to provide negative feedback in said amplifier.

4. A correction circuit as recited in claim 1 wherein said summing means comprises first and second resistors respectively connected at first terminals thereof with the outputs of said first and second means, and at second terminals thereof in common to said input terminal of said correction amplifier.

5. A waveform correction circuit as recited in claim 1 wherein said first means comprises:

- means for sensing the deflection current and producing an output voltage proportional thereto, and
- first differentiating means for differentiating the output voltage of said sensing and producing means.

6. A waveform correction circuit as recited in claim 5 wherein said sensing means comprises inductive pickup means connected in series between said deflection yoke circuit and said output terminal of said correction amplifier.

7. A waveform correction circuit as recited in claim 1 wherein said second means comprises:

- means for supplying a reference voltage comprising a linearity corrected sweep voltage, and
- second differentiating means for differentiating the reference voltage.

8. A waveform correction circuit as recited in claim 7, wherein said deflection yoke is utilized with a display cathode ray tube having a display surface of given curvature, said reference voltage means providing the linearity corrected sweep voltage in accordance with said given curvature.

9. A waveform correction circuit as recited in claim 7 wherein said deflection yoke is utilized with a display cathode ray tube for producing a horizontal scanning beam deflection therein and wherein said reference voltage supplying means supplies a sweep voltage having linearity correction for pincushion error in the display of the cathode ray tube.

10. A waveform correction circuit as recited in claim 1 wherein

- said first and second means supply the respective output voltages thereof in opposite phase to said summing means, and
- said summing means supplies the difference of said output voltages of said first and second means to said input terminal of said correction amplifier.

11. A waveform corrected resonant recovery deflection system comprising:

- a deflection current generating circuit including:
  - in parallel connection between a common junction and a first reference potential terminal, a transistor and a diode poled for respectively opposite directions of conduction, said transistor being controlled in conduction by a periodic timing signal input,
  - a retrace capacitor,
  - a charging coil connected between said common junction and a second reference potential terminal,
  - the inductor of a deflection yoke connected at one terminal thereof to said common junction, and
  - an S-curve correction capacitor connected in series with said deflection yoke inductor, and
- a waveform correction circuit including:
  - a correction amplifier,
  - means for sensing the deflection current supplied by said generating circuit to said inductance of said deflection yoke and producing a differentiated output voltage proportional to the sensed deflection current, means for supplying a differentiated, linearity corrected sweep voltage, summing means for receiving and summing the differentiated output voltage proportional to the deflection current and the differentiated reference voltage for supplying the difference of the differentiated voltages to the input of said correction amplifier, and the output of said correction amplifier being supplied to the deflection yoke inductor.

12. A waveform corrected resonant recovery deflection system as recited in claim 11 wherein there is further provided first and second clipper means respectively receiving the differentiated output voltage proportional to the deflection current and the differentiated, linearity corrected sweep voltage, for clipping the differentiated voltages prior to supply thereof to said summing means.

13. In a resonant recovery deflection system having switching means responsive to an input timing signal for periodically energizing an inductor of a magnetic deflection yoke from a power source and including an S-curve capacitor connected in series with said deflection inductor, a correction circuit for correcting the waveform of the deflection current in said in-ductor, comprising:

first means responsive to the current flowing through said inductor for producing an output signal proportional to the derivative of the deflection current, second means for producing an output voltage proportional to the derivative of a linearity corrected sweep voltage, summing means for receiving and summing the differ-entiated voltage outputs of said first and second means for providing a summed output, and a correction, class A amplifier having an input coupled to receive the summed output of said summing means and an output connected for applying a correction signal to said inductor of said deflection yoke, said class A amplifier including a feedback resistive element connected in parallel thereto.

14. In a resonant recovery deflection system having switching means responsive to an input timing signal for periodically energizing an inductor of a magnetic deflection yoke from a power source and including an S-curve correction capacitor in series connection with said deflection inductor, a correction circuit responsive to the inductor current for providing a correction signal to said inductor, comprising:

a correction amplifier having input and output terminals, and connected at said output terminal for applying the correction signal to said inductor of said deflection yoke, a current transformer having a first winding connected in series with said deflection inductor and said output terminal of said correction amplifier, and a second winding inductively coupled to said first winding, a resistor connected in parallel with said second winding for producing an output voltage proportional to the deflection inductor current, differentiating means for differentiating the output voltage derived from said resistor, reference means for producing an output voltage proportional to the derivative of a linearity corrected sweep voltage, and summing means for receiving and summing the output of said differentiating means and said reference means for supply to said input terminal of said correction amplifier.

* * * * *